United States Patent [19]

Dean et al.

[11] Patent Number: 4,719,376
[45] Date of Patent: Jan. 12, 1988

[54] ELECTROMAGNETIC VIBRATORY EXCITER

[75] Inventors: Arthur L. Dean; Robert E. Kraft; Kenneth M. Marshall, all of Indiana, Pa.

[73] Assignee: FMC Corporation, Chicago, Ill.

[21] Appl. No.: 790,792

[22] Filed: Oct. 24, 1985

Related U.S. Application Data

[60] Continuation-in-part of Ser. No. 584,695, Feb. 29, 1984, abandoned, Division of Ser. No. 352,284, Feb. 25, 1982, Pat. No. 4,455,496.

[51] Int. Cl.[1] .............................................. H02K 33/00
[52] U.S. Cl. .......................................... 310/29; 310/15
[58] Field of Search .................. 310/29, 15, 30, 78, 310/32, 33, 21, 22

[56] References Cited

U.S. PATENT DOCUMENTS

| | | | |
|---|---|---|---|
| 3,293,515 | 12/1966 | Klemm | 310/29 X |
| 3,333,219 | 7/1967 | Makino | 310/30 X |
| 3,522,460 | 8/1970 | Spurlin | 310/29 |
| 3,604,959 | 9/1971 | Sturman | 310/29 X |
| 4,455,496 | 6/1984 | Dean et al. | 310/29 |

Primary Examiner—Donovan F. Duggan
Attorney, Agent, or Firm—R. E. Parks; D. W. Rudy; R. B. Megley

[57] ABSTRACT

An electromagnetic vibratory exciter having a non-linear elastomeric compression spring mounted in four quadrants around an electromagnet. The spring having curved armature contact surfaces of different heights on laterally opposite adjacent quadrants for providing selectable non-linear stiffening and deflection rates.

16 Claims, 8 Drawing Figures

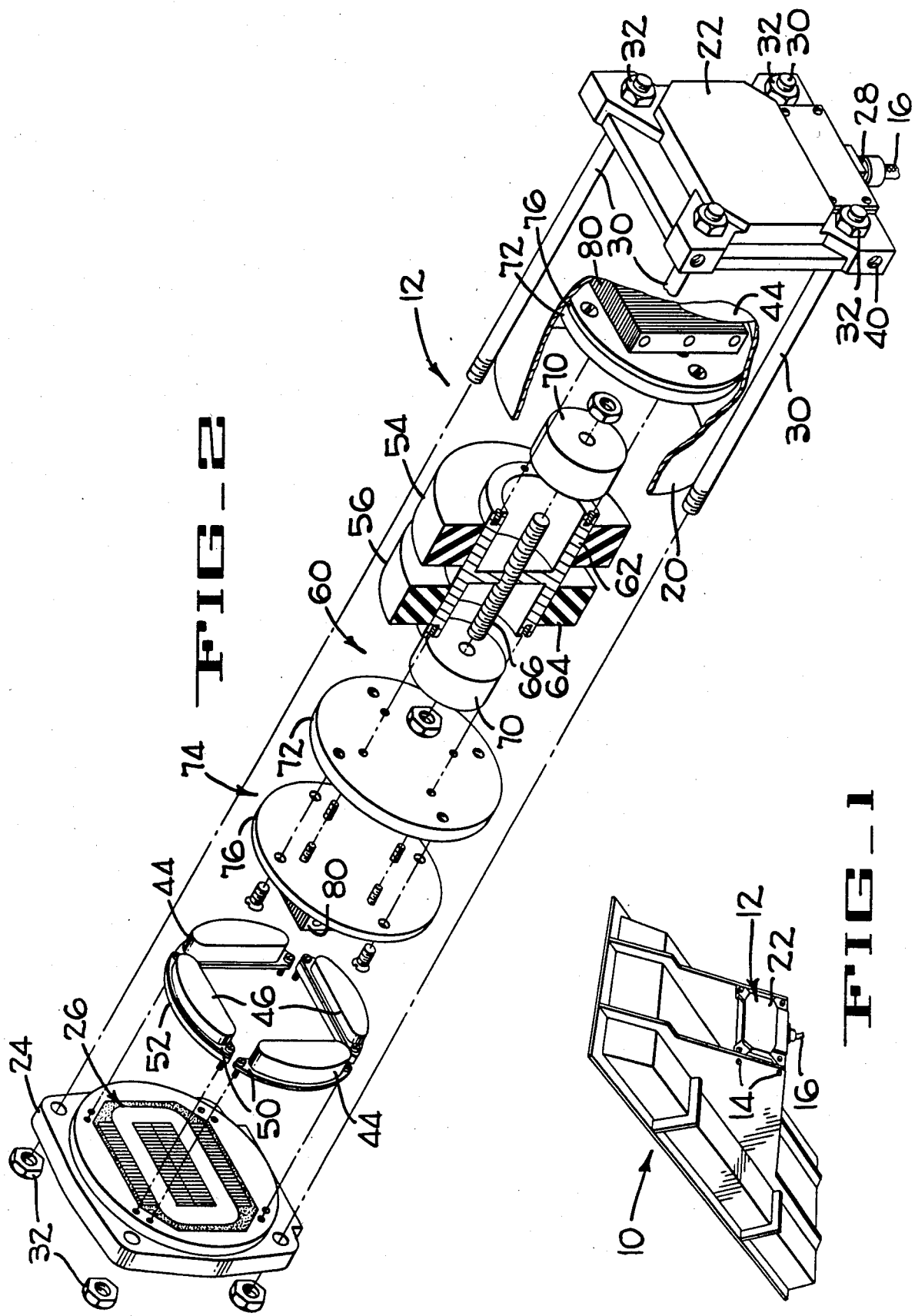

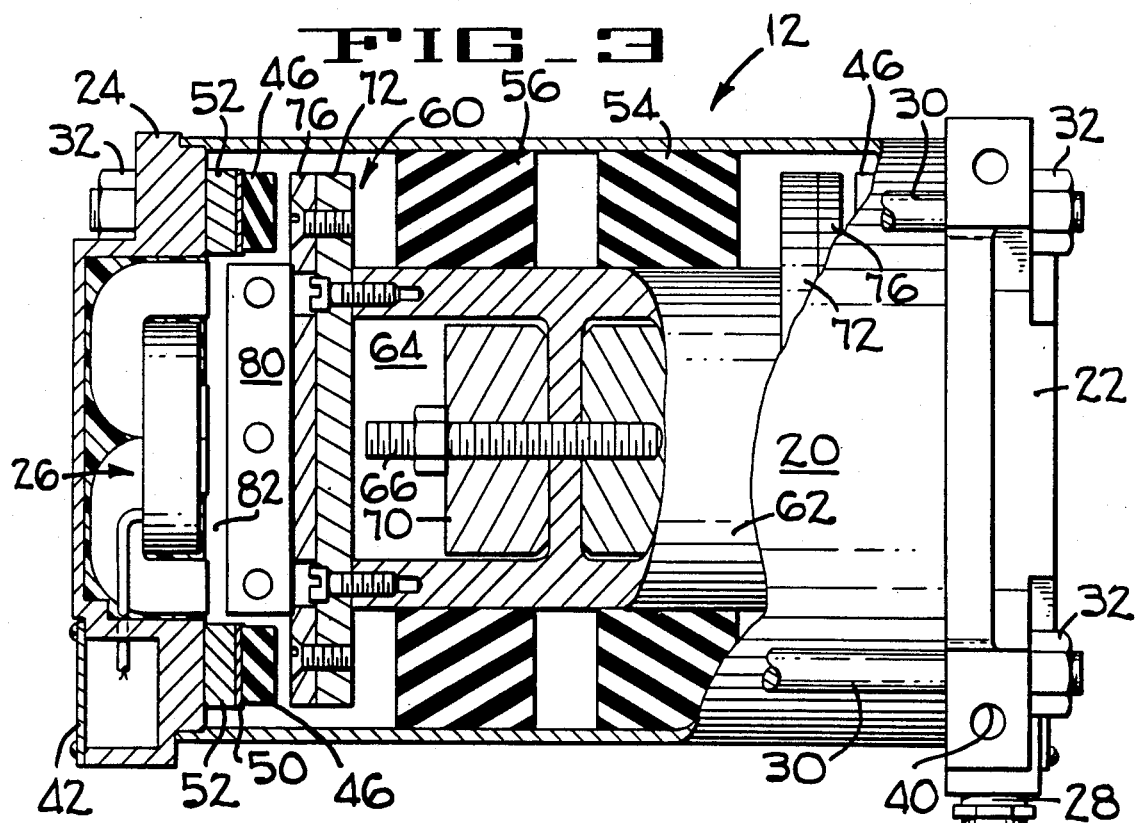
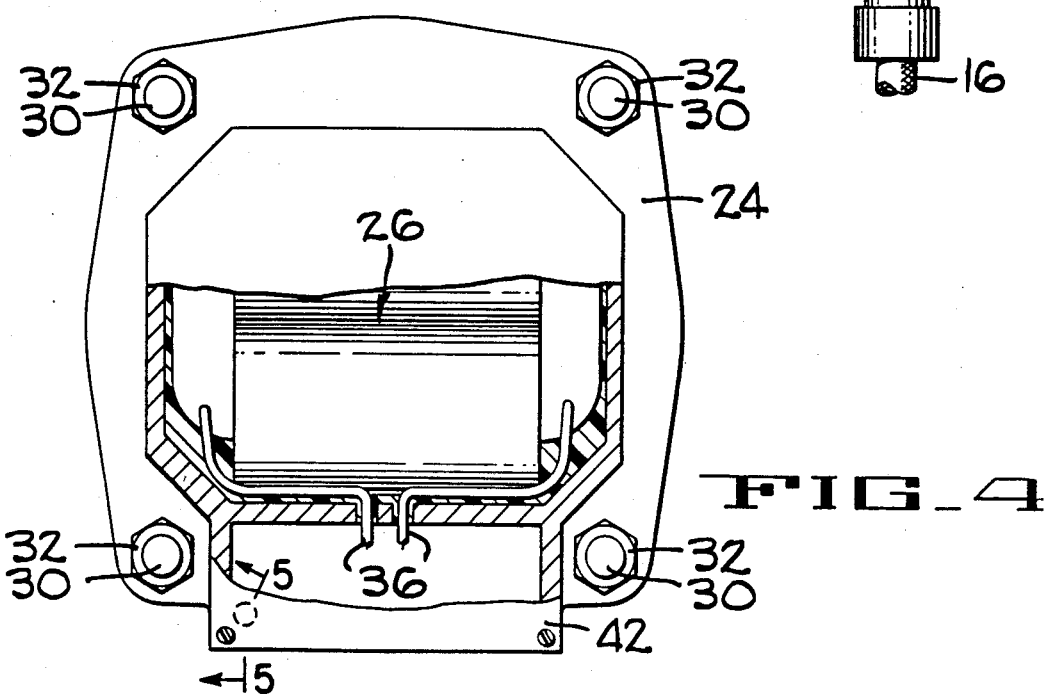

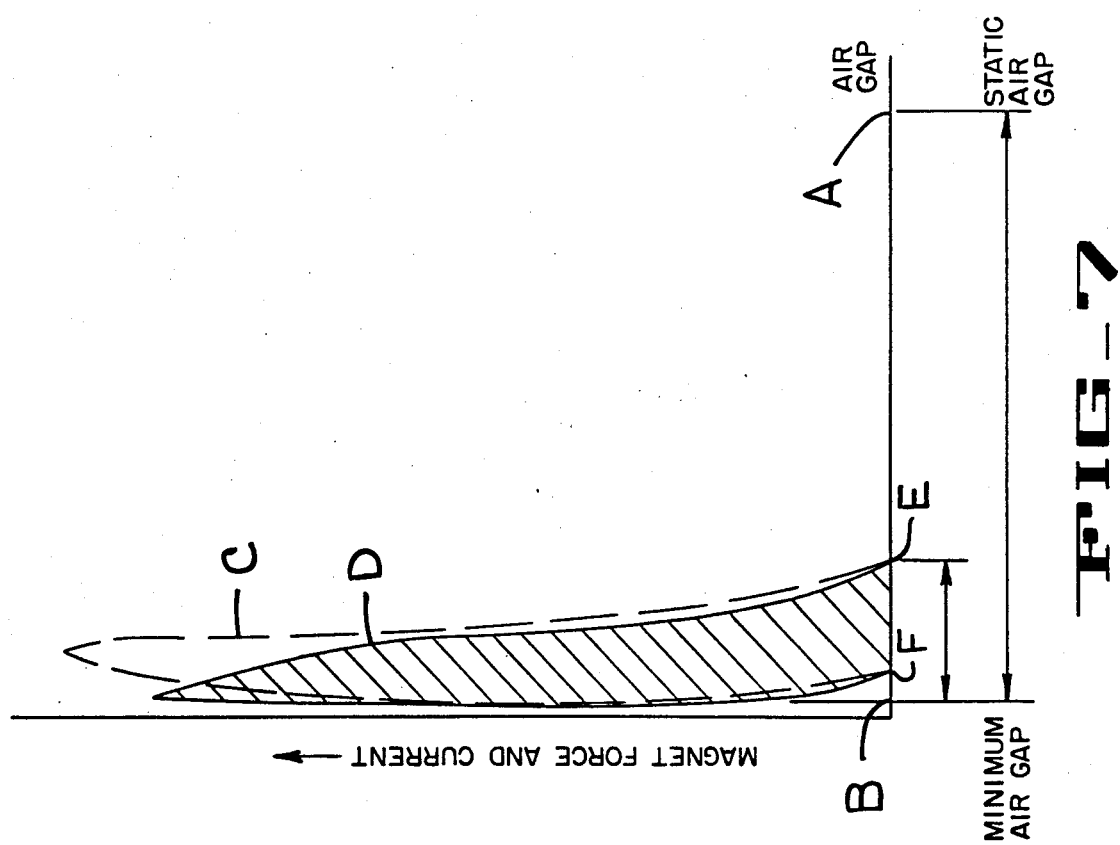
FIG_7
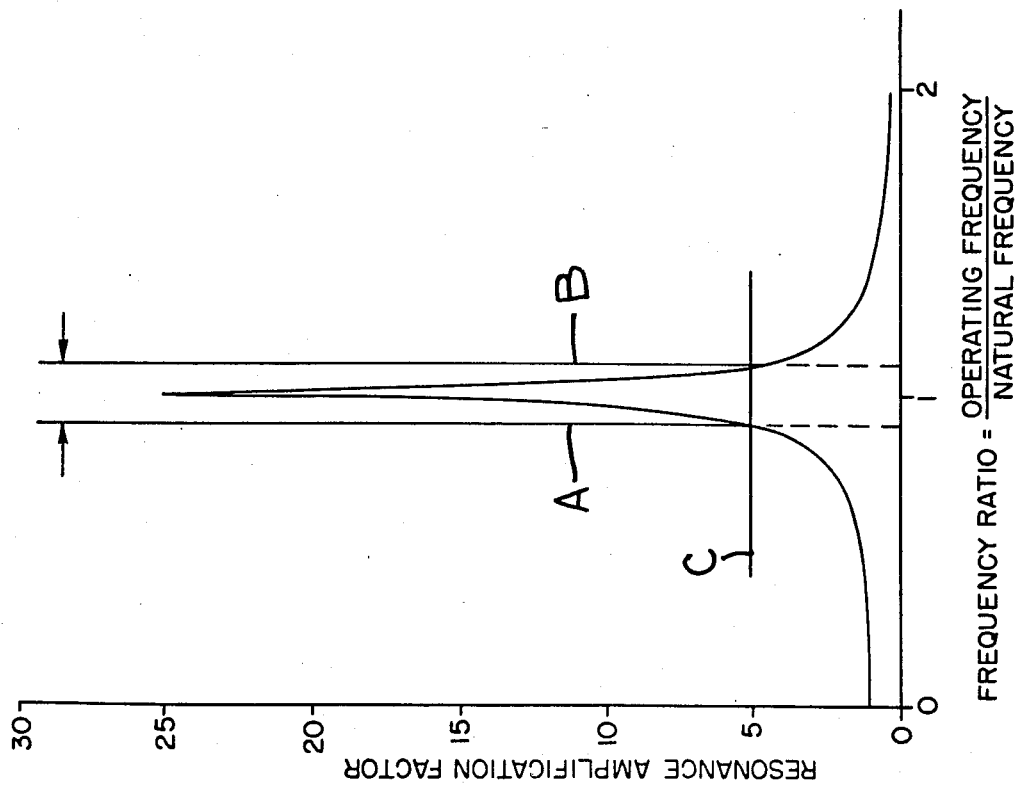
FIG_6

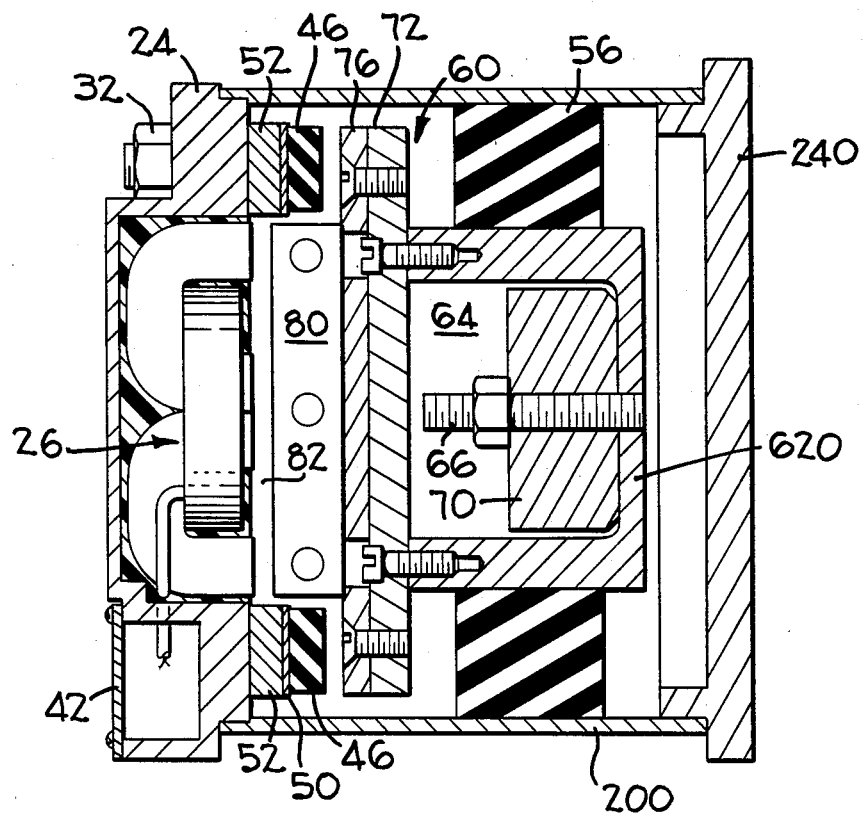

ELECTROMAGNETIC VIBRATORY EXCITER

This is a continuation-in-part of application Ser. No. 584,695, filed 2/29/84, and now abandoned, which in turn is a division of 352,284 filed 2/25/82 now U.S. Pat. No. 4,455,496.

The invention concerns electromagnetic vibratory exciters for use in imparting vibratory excitation into a host mass for use, for instance, in vibratory conveyor equipment, bin hoppers and chutes for bulk material transport and metered delivery.

Electromagnetic vibratory drive units have been extensively used in industry to ensure the smooth flow of bulk materials from storage bins, hoppers and delivery chutes. Electromagnetic vibratory drive units are also used in vibratory feeders for feeding various bulk materials to mixers, grinders, crushers, packaging machinery, batching, grading or mixing stations. The electromagnetic exciters are coupled to a delivery trough which is vibrated by the exciter to control material flow along the chute, trough, or pan.

In general electromagnetic powered vibratory systems are two mass designs each mass carrying the magnets or armature. The two masses are connected by springs that normally are sized to have the system utilize resonance amplification of the motion. Electromagnets produce useful forces only when the pole faces are in close proximity to each other such as one tenth (0.1) inch or less. The attraction force increases approximately with the inverse of the gap squared. The system motion is divided between the two masses inverse to their weight, that is the lighter mass moves proportionately further. The masses move in opposite directions as the air gap between pole faces increases and decreases.

Provisions must therefore be made to prevent the pole faces from striking as they move close to the minimum gap and the magnet force is approaching its peak.

The invention presented herein provides an electromagnetic vibratory exciter that incorporates a totally enclosed free mass carried inside an elongated housing. The housing includes a pair of end caps each receiving a potted electromagnet. The end caps are separated by a housing tube secured between them.

The free mass is suspended by elastomeric shear springs inside the housing tube equidistant from each end cap. A pair of armature assemblies are integral with the free mass, one armature at each end of the generally elongated free mass.

Rubber compression elements are interposed between and normally spaced apart from the free mass and the electromagnet retaining end caps. These non-linear springs help to avoid armature strike and store the input energy during electromagnet conduction resulting in high efficiency.

The electromagnets are sequentially energized through a remotely located controller that is connected to the first electromagnet retaining end cap. An armored conduit extends from the first end cap to the second end cap. Upon energization of the electromagnets in sequence the free mass will be moved longitudinally through the housing and into contact with the elastomeric compression elements and will cycle back and forth responsive to electromagnet energization and de-energization. The frequency of operation is close to the natural frequency of the machine over a broad range of driven weights to utilize resonance.

It is also contemplated that an electromagnetic vibratory exciter having a similar elongate motor housing could have a single electromagnet means carried inside the housing at one end thereof. In this embodiment there would be spring means inside the housing longitudinally adjacent the electromagnet means. The free mass inside the housing would carry an armature means longitudinally adjacent the electromagnet means and would be supported for longitudinal movement inside the housing.

The apparatus and operation of the invention will be readily understood through perusal of the following description in conjunction with the drawing figures wherein:

FIG. 1 is a simplified illustration of a feeder trough to which the electromagnetic exciter has been mounted;

FIG. 2 is an exploded view of the invention with some components broken away;

FIG. 3 is an elevation view of FIG. 2 with some components broken away and sectioned for clarity;

FIG. 4 is an end view of the device of FIG. 2 with part of the housing broken away and sectioned;

FIG. 5 is a side elevation view of 5—5 of FIG. 4.

FIG. 6 is a graph showing the frequency response range of the electromagnetic exciter;

FIG. 7 is a graph showing the energy output of the electromagnet.

FIG. 8 is an elevation view of a second embodiment of the invention, which is one-half of the electromagnetic exciter assembly shown in FIG. 3.

A bulk material handling trough generally 10 in FIG. 1 provides a typical application for the electromagnetic vibratory exciter of the invention. The exciter, generally 12, will be fastened to the trough by means such as fasteners 14. A supply conduit 16 will extend from the electromagnetic exciter to a control module typically remotely stationed.

The mechanical aspects of the invention can be easily understood by studying FIG. 2 which is a projected view of the electromagnetic exciter generally 12. The exciter is a unitized closed structure having a housing tube 20 which may be of a sturdy structural material such as aluminum. First and second end caps 22 and 24 respectively act as magnet housings each containing a potted electromagnet such as 26 in end cap 24. The end caps 22 and 24 are placed on opposite ends of the housing tube 20. In one embodiment studs such as 30 are secured with fasteners such as 32 to securely maintain the housing's integrity. The housing is an elongated container that is sealed against intrusion due to its construction. This containerized housing provides the possibility of an explosion proof housing that is not possible with more conventional electromagnetic exciters.

The first end cap 22 is provided with an electrical conduit terminal 28 to accept the supply conduit 16. FIG. 5 shows conduit 34 running between the first and second end caps 22 and 24 for carrying the wire bundle 36 used to provide electrical pulses to the electromagnet 26.

The first end cap 22 may also be provided with threaded apertures such as 40 to provide one method of mounting the electromagnetic exciter generally 12 to the apparatus to be vibrated.

Looking at FIGS. 2, 3 and 4, parts solidly carried inside the housing can be identified. Electromagnet 26, as well as its twin carried at the opposite end of the housing tube 20 (not visable) and its electrical supply wires from the bundle 36 as well as cover plate 42 are clearly shown.

Inside the housing tube and attached to each end cap are elastomeric compression elements such as pairs of identical elements 44 and 46 making up spring elements that function as the non-linear elements in this system. The pairs differ from each other in the thickness of the elastomeric components.

A first pair 44 of elastomeric compression elements are bonded or otherwise suitably affixed to a backing plate such as 50 which in turn is mounted by fastening means to the inside face of the end plate at each end of the housing tube. A cap of fabric reinforced material may be integral with the elastomeric body portion. The cap would eliminate relative motion between the elastomer and the mounting plate 76 during spring compression. The second pair 46 of elastomeric compression elements 46 are also suitably affixed to a similar backing plate but may have shims, one shown as 52, interposed between the backing plate and the end cap to which it is mounted. The elastomeric compression elements are symmetrically arranged so that pair members are on diametrically opposite sides of the longitudinal axis of the housing. The thickness of the elastomeric compression elements and the shims associated therewith are variables that can be changed in order to provide desirable operating characteristics of a specified electromagnetic exciter. The stacking height of each pair of elastomeric compression elements at each end of the housing may be different from the other pair at the same end so that better control of the non-linear aspect of this spring means is possible. The elastomeric compression elements provide the non-linear stiffening rate and self-limiting deflection of the device.

It should be noted that the housing tube and end caps as well as all the equipment and parts mentioned above are part of the driven mass in the vibrating system since they are integrally connected together in the assembled embodiment.

A free mass generally 60 is totally enclosed and suspended inside the housing tube 20 between the end caps 22 and 24. FIGS. 2 and 3 are helpful in identifying its parts. First and second annular rubber or elastomeric shear springs 54 and 56 are pressed into the interior of the elongate housing tube 20 to suspend the free mass generally 60.

The free mass includes a steel central member 62 of a generally elongate configuration having apertured wall portions defining a pair of recesses such as 64. This free mass is supported by and functionally secured to the inside apertures of the first and second annular rubber shear springs. Retainer means such as threaded rod 66 is provided to retain tuning weights such as 70 which may be held in place by fasteners.

The tuning weights such as 70 are important to this invention as they are an interchangeable element that enables changes in the weight of the free mass even though the general sizes and component configuration of the electromagnetic exciter remains constant. Tuning weights can be changed without the need of changing or adjusting the rate of the supporting shear springs during tuning. Thus exciters of different capacities can be manufactured from common components to advantageously utilize economies of scale. Universal tuning is made possible by the proper selection of the natural frequency of the free mass and the shear springs 54 and 56. This universal tuning allows the exciter to deliver rated power regardless of the weight of the driven member to which it is attached.

After the tuning weights are in position the flange plates such as 72 are suitably fastened to the opposite ends of the central member 62. Armature assemblies generally 74, including a mounting plate 76 and a generally rectangular armature 80 are fastened to the flange plate 72. An alternative method of assembly would be to eliminate the mounting plates and mount the armatures directly to the flange plates 72.

Upon assembly of the electromagnetic exciter an air gap 82 exists between the face of the armatures such as 80 and the faces of the electromagnets such as 26 when in a static state. Upon actuation the air gap will cylically decrease and increase but the pole faces will not strike if proper non-linear spring (44, 46) selection has been made.

It should be mentioned, as is obvious from the drawing figures, that components on the interior of the housing are symetrically similar on each end of the steel central member. The symmetry resulting from this structure and the dual opposing electromagnets is beneficial to good exciter operation.

As stated earlier a second embodiment is also contemplated. This embodiment is shown in FIG. 8 and has a single electromagnet 26 and armature means 74 while retaining the central member 620 supported on one or a plurality of shear springs such as 56. The shear spring 56 may be bonded to the interior of the elongate motor housing 200 and to the central member 620 if desired. This "half-unit" of the vibratory unit shown in FIG. 3, comprises one of the electromagnet means 26, one set of spring means 44 and 46 with the back plates 50 and shims 52, one of the armature assemblies 74, the flange plate 72, tuning weight 70 and an end cap 240. Optionally, the flange plate 72 as well as all attaching hardware could be eliminated from the exciter. Of course, the pulsed source of electrical energy need only be provided to the single electromatnet 26. FIGS. 6 and 7 graphically display the advantages gained through the embodiment presented herein.

FIG. 6 graphically represents the universal tuning advantage of the exciter. The frequency ratio on the x-axis shows that maximum amplitude occurs where the operating frequency of the exciter and the natural frequency of the system are the same. The included portion of the curve between A and B represents the operating region for an exciter of a given free mass applied to a broad range of driven weights. The exciter is tuned, by judicious selection of the tuning weights, such that the natural frequency of the system is equal to the operating frequency of the exciter. That would mean that the exciter would be tuned so that the frequency ratio is between A and B for a broad range of driven weights. The resonance amplification in this range is at least five.

The exciter would continue to perform efficiently to a super-resonance represented where line B intersects the curve. The resonance amplification factor would again be five. In summary it is apparent that this exciter is close to resonance over a broad weight range of driven masses.

Without the compression elements the pole faces would strike at the higher amplification factors. Line C shows the full system deflection which is maintained by these elements.

In FIG. 7 the electrical power pulse timing and the force produced by the electromagnet is graphically depicted. Each electromagnet is energized once per mechanical cycle. Although not shown in the drawing figures a controller will be remotely mounted from the exciter and designed to supply each electromagnet sequentially with a pulse of electrical energy timed appropriately to energize each electromagnet. The static air gap A at the right side of the graph depicts a position where the armature free mass is equally spaced apart from the electromagnets. Proceeding to the left of the graph towards the minimum air gap the duration of the electrical pulse to the electromagnet is shown by the curve designated as broken line C. The force produced by the electromagnet is shown by curve D while the area under the curve is the energy output of the magnet. The electromagnet is energized during the deflection of the free mass towards the electromagnets in the zone from E to B (the minimum air gap). As the air gap opens current continues to flow back to point F therefore the net energy produced is that indicated by the cross-hatched area under the curve. This energy is that stored in the compression springs 44 and 46. Electromagnet coils designed for energization in the manner described make it possible to store significantly more energy per cycle then the designs of the prior art.

Depending on the design of the compression elements this stored energy resulting from the initial impact of the free mass directed toward the compression element provides approximately 30% of the force needed to accelerate the free mass in the opposite direction. This results in an electrical power savings and the attendant cost benefit. Since the compression elements are non-linear any armature striking can be avoided through proper selection of the elements.

What is claimed is:

1. An electromagnetic exciter for a vibratory conveyor comprising:
an elongated housing capped at opposite longitudinal ends by end caps, one of the end caps carrying an electromagnet inside of the housing, an elongated free mass resiliently supported on the inside of the housing and carrying an armature assembly on a side facing the electromagnet, a non-linear elastomeric compression means mounted on the one end cap and encircling the electromagnet, the elastomeric compression means having curved outer and elongated inner peripheries in four quadrants laterally spaced from the electromagnet, and having a planar base surface in the four quadrants for mounting to the one end cap, and having a contact surface in the four quadrants for contacting the armature assembly during electromagnetic conduction and for preventing armature strike against the electromagnet, the contact surfaces in lateral opposite quadrants of a different height than the contact surfaces in the adjacent lateral opposite quadrants for providing selectable non-linear stiffening and deflection rates for storing input energy.

2. An electromagnetic exciter according to claim 1, wherein the elastomeric compression means comprises two pairs of elastomeric compression elements symmetrically mounted to the one end cap, one pair having the contact surfaces of different height than that of the other pair.

3. An electromagnetic exciter according to claim 2 wherein shims are provided for the one pair to position the contact surfaces a predetermined longitudinal distance from the armature assembly.

4. An electromagnetic exciter according to claim 2 wherein the compression elements of each pair have a curved outer periphery, an elongated inner periphery, end portions merging the inner and outer peripheries, a planar base surface extending between the end portions, and a contact surface on the opposite side of the base surface.

5. The invention in accordance with claim 1, wherein said free mass is:
supported by elastomeric shear spring means; and tuning weight means carried in a chamber in said free mass.

6. The invention in accordance with claim 5, wherein said tuning weight means is of a predetermined weight and positioned inboard of the armature assembly in the chamber in the free mass for tuning the exciter to a frequency ratio between a natural frequency of the vibratory conveyor and an operating frequency of the exciter within a resonance range having an amplification factor of at least five independent of the weight of the vibratory conveyor.

7. An electromagnetic vibratory exciter according to claim 6, wherein the non-linear elastomeric compression means maintains the amplication factor at five as the frequency ratio approaches one preventing armature strike against the electromagnetic at amplication factors higher than five.

8. An electomagnetic vibratory exciter according to claim 6 wherein a pulse of electrical energy is delivered to the electromagnet having a duration of between twenty and thirty percent of a full mechanical cycle of said electromagnetic vibratory exciter.

9. An electromagnetic vibratory exciter according to claim 8 wherein said pulse of electrical energy energizes the electromagnet during the deflection of said free mass up to a minimum air gap between said armature assembly and said electromagnet.

10. An electromagnet vibratory exciter according to claim 9, wherein the non-linear elastomeric compression means store twenty to thirty percent of total system energy at the minimum air gap.

11. The invention in accordance with claim 5, wherein said electromagnetic vibratory exciter further comprises a source of pulsed electrical energy for energizing said electromagnet whereby said armature assembly and said free mass will be attracted towards said electromagnet for the duration of an energizing pulse and will cause said elastomeric compression means to be compressed.

12. The invention in accordance with claim 11, wherein said compressed elastomeric compression means will urge said armature assembly and free mass away from said electromagnet when said pulse of electrical energy is terminated to said electromagnet.

13. The invention in accordance with claim 1, wherein said elastomeric compression means comprises a first and a second pair of elastomeric spring means, said first pair having a first compressibility factor and said second pair having a second a compressibility factor each of said first and second pairs having one of each element mounted diametrically opposite the other element of each pair.

14. The invention in accordance with claim 13, and a shim means for spacing one of said pairs of elastomeric spring means longitudinally away from said armature assembly.

15. The invention in accordance with claim 13, wherein each of said elastomeric spring means is provided with a fabric reinforced cap on the contact surface thereof.

16. The invention in accordance with claim 13, wherein said elastomeric spring means comprises an annular elastomeric shear spring bonded to the interior of said elongate housing and to said free mass.

* * * * *